US012594696B2

(12) United States Patent
Matsen et al.

(10) Patent No.: US 12,594,696 B2
(45) Date of Patent: Apr. 7, 2026

(54) CURING COMPOSITES OUT-OF-AUTOCLAVE USING INDUCTION HEATING WITH SMART SUSCEPTORS

(71) Applicant: The Boeing Company, Arlington, VA (US)

(72) Inventors: Marc R. Matsen, Seattle, WA (US); John F. Spalding, Renton, WA (US)

(73) Assignee: The Boeing Company, Arlington, VA (US)

( * ) Notice: Subject to any disclaimer, the term of this patent is extended or adjusted under 35 U.S.C. 154(b) by 359 days.

(21) Appl. No.: 18/306,814

(22) Filed: Apr. 25, 2023

(65) Prior Publication Data

US 2024/0066762 A1     Feb. 29, 2024

Related U.S. Application Data

(60) Provisional application No. 63/373,803, filed on Aug. 29, 2022.

(51) Int. Cl.
B29C 35/08 (2006.01)
B29C 70/44 (2006.01)

(52) U.S. Cl.
CPC .. B29C 35/0805 (2013.01); B29C 2035/0811 (2013.01); B29C 70/44 (2013.01)

(58) Field of Classification Search
None
See application file for complete search history.

(56) References Cited

U.S. PATENT DOCUMENTS

| | | | | |
|---|---|---|---|---|
| 5,709,893 | A * | 1/1998 | McCarville | ........ B29D 99/0007 |
| | | | | 425/389 |
| 9,023,265 | B1 * | 5/2015 | Rotter | ..................... B29C 70/30 |
| | | | | 264/258 |
| 10,336,019 | B2 | 7/2019 | Nelson et al. | |
| 10,828,880 | B1 * | 11/2020 | Wadsworth | ....... B29C 66/73921 |
| 2005/0253309 | A1 | 11/2005 | Hou et al. | |
| 2007/0175171 | A1 | 8/2007 | Delgado et al. | |
| 2008/0245928 | A1 * | 10/2008 | Kulesha | ................. B64C 3/187 |
| | | | | 244/123.1 |
| 2012/0145703 | A1 * | 6/2012 | Matsen | ................... B29C 73/10 |
| | | | | 219/618 |
| 2017/0129232 | A1 | 5/2017 | Burd et al. | |

FOREIGN PATENT DOCUMENTS

| | | |
|---|---|---|
| EP | 2512783 B1 | 1/2017 |
| WO | 2018200949 A1 | 11/2018 |

OTHER PUBLICATIONS

European Patent Office Extended Search Report, dated Jan. 23, 2024, regarding Application No. EP23192343.4, 7 pages.

* cited by examiner

*Primary Examiner* — Christopher T Schatz
(74) *Attorney, Agent, or Firm* — Yee & Associates, P.C.

(57) ABSTRACT

Methods and an induction curing system for curing a composite panel. The induction curing system comprises; a rigid curing tool configured to hold a composite material; a vacuum bagging material sealed to the rigid curing tool; and a dimensional control structure having a lattice and an open casing formed of a rigid material, the lattice positioned within a concavity of the open casing, the dimensional control structure sealed to at least one of the vacuum bagging material or the rigid curing tool.

21 Claims, 10 Drawing Sheets

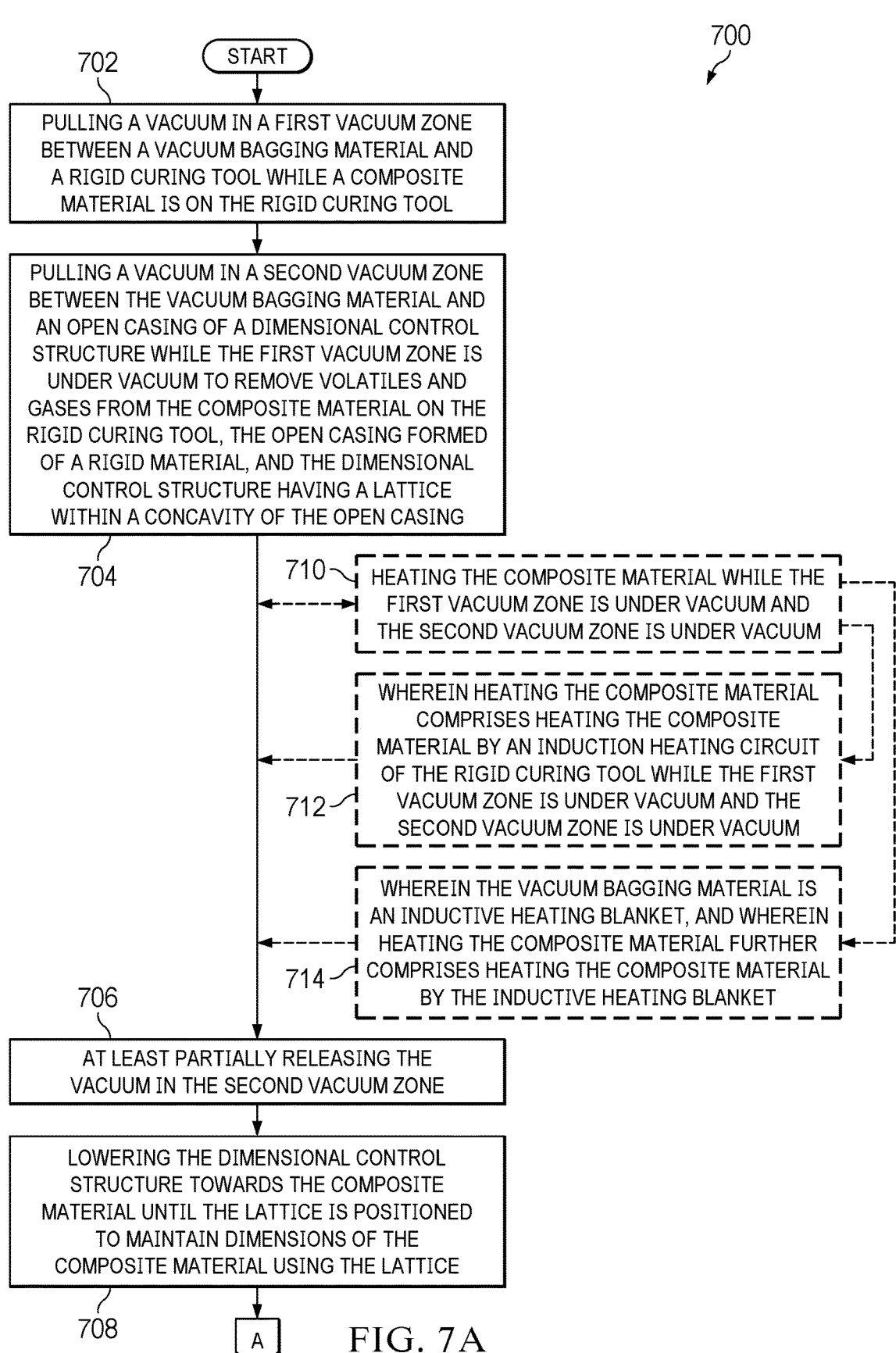

700

702

START

PULLING A VACUUM IN A FIRST VACUUM ZONE
BETWEEN A VACUUM BAGGING MATERIAL AND
A RIGID CURING TOOL WHILE A COMPOSITE
MATERIAL IS ON THE RIGID CURING TOOL

PULLING A VACUUM IN A SECOND VACUUM ZONE
BETWEEN THE VACUUM BAGGING MATERIAL AND
AN OPEN CASING OF A DIMENSIONAL CONTROL
STRUCTURE WHILE THE FIRST VACUUM ZONE IS
UNDER VACUUM TO REMOVE VOLATILES AND
GASES FROM THE COMPOSITE MATERIAL ON THE
RIGID CURING TOOL, THE OPEN CASING FORMED
OF A RIGID MATERIAL, AND THE DIMENSIONAL
CONTROL STRUCTURE HAVING A LATTICE
WITHIN A CONCAVITY OF THE OPEN CASING

704

710 — HEATING THE COMPOSITE MATERIAL WHILE THE
FIRST VACUUM ZONE IS UNDER VACUUM AND
THE SECOND VACUUM ZONE IS UNDER VACUUM

WHEREIN HEATING THE COMPOSITE MATERIAL
COMPRISES HEATING THE COMPOSITE
MATERIAL BY AN INDUCTION HEATING CIRCUIT
OF THE RIGID CURING TOOL WHILE THE FIRST
VACUUM ZONE IS UNDER VACUUM AND THE
712 — SECOND VACUUM ZONE IS UNDER VACUUM

WHEREIN THE VACUUM BAGGING MATERIAL IS
AN INDUCTIVE HEATING BLANKET, AND WHEREIN
HEATING THE COMPOSITE MATERIAL FURTHER
714 — COMPRISES HEATING THE COMPOSITE MATERIAL
BY THE INDUCTIVE HEATING BLANKET

706

AT LEAST PARTIALLY RELEASING THE
VACUUM IN THE SECOND VACUUM ZONE

LOWERING THE DIMENSIONAL CONTROL
STRUCTURE TOWARDS THE COMPOSITE
MATERIAL UNTIL THE LATTICE IS POSITIONED
TO MAINTAIN DIMENSIONS OF THE
COMPOSITE MATERIAL USING THE LATTICE

FROM FIG. 7A

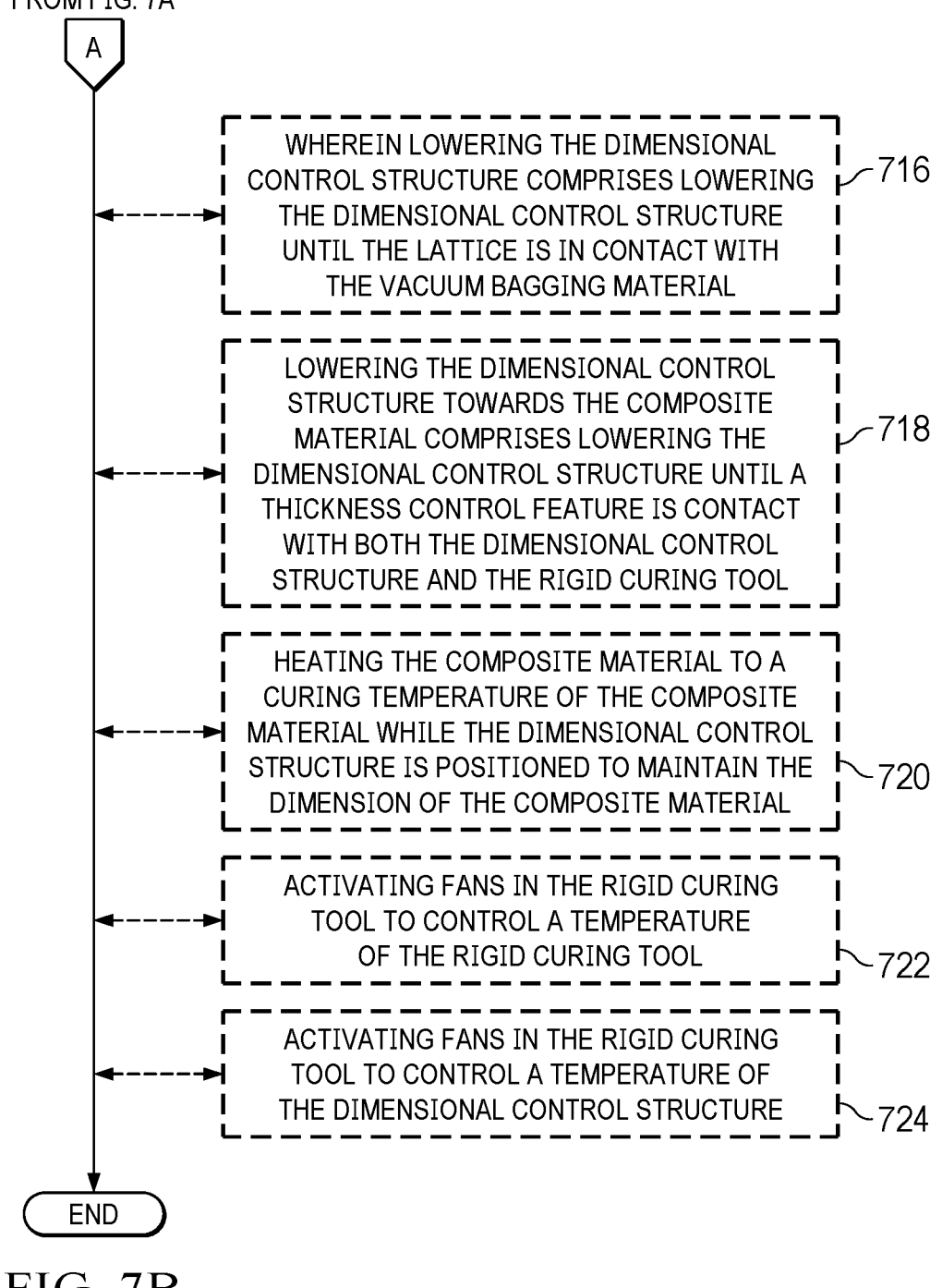

A

WHEREIN LOWERING THE DIMENSIONAL CONTROL STRUCTURE COMPRISES LOWERING THE DIMENSIONAL CONTROL STRUCTURE UNTIL THE LATTICE IS IN CONTACT WITH THE VACUUM BAGGING MATERIAL ⟋716

LOWERING THE DIMENSIONAL CONTROL STRUCTURE TOWARDS THE COMPOSITE MATERIAL COMPRISES LOWERING THE DIMENSIONAL CONTROL STRUCTURE UNTIL A THICKNESS CONTROL FEATURE IS CONTACT WITH BOTH THE DIMENSIONAL CONTROL STRUCTURE AND THE RIGID CURING TOOL ⟋718

HEATING THE COMPOSITE MATERIAL TO A CURING TEMPERATURE OF THE COMPOSITE MATERIAL WHILE THE DIMENSIONAL CONTROL STRUCTURE IS POSITIONED TO MAINTAIN THE DIMENSION OF THE COMPOSITE MATERIAL ⤸720

ACTIVATING FANS IN THE RIGID CURING TOOL TO CONTROL A TEMPERATURE OF THE RIGID CURING TOOL ⤸722

ACTIVATING FANS IN THE RIGID CURING TOOL TO CONTROL A TEMPERATURE OF THE DIMENSIONAL CONTROL STRUCTURE ⤸724

END

Figure 8:
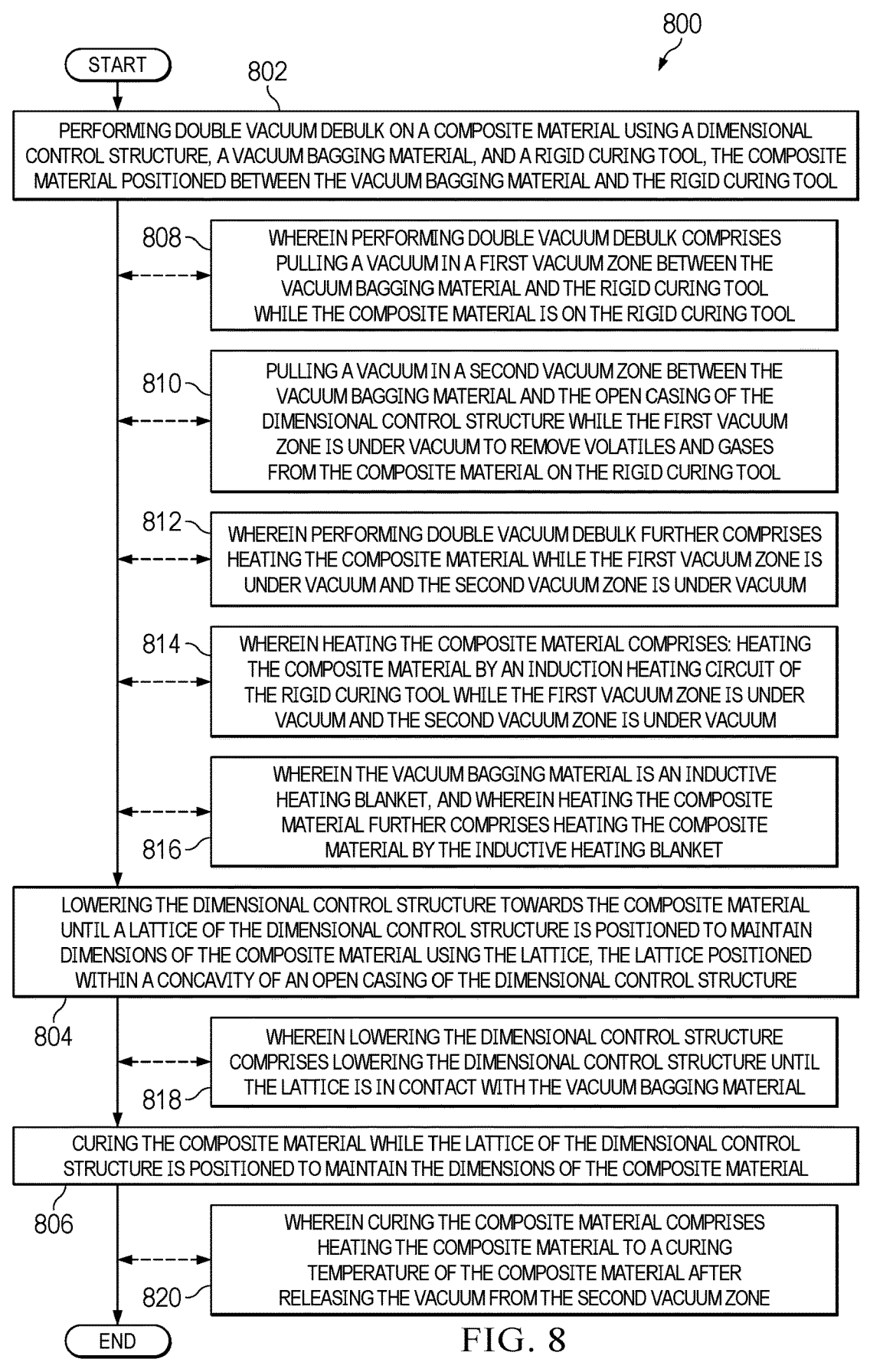

START — 802

PERFORMING DOUBLE VACUUM DEBULK ON A COMPOSITE MATERIAL USING A DIMENSIONAL CONTROL STRUCTURE, A VACUUM BAGGING MATERIAL, AND A RIGID CURING TOOL, THE COMPOSITE MATERIAL POSITIONED BETWEEN THE VACUUM BAGGING MATERIAL AND THE RIGID CURING TOOL

808 — WHEREIN PERFORMING DOUBLE VACUUM DEBULK COMPRISES PULLING A VACUUM IN A FIRST VACUUM ZONE BETWEEN THE VACUUM BAGGING MATERIAL AND THE RIGID CURING TOOL WHILE THE COMPOSITE MATERIAL IS ON THE RIGID CURING TOOL

810 — PULLING A VACUUM IN A SECOND VACUUM ZONE BETWEEN THE VACUUM BAGGING MATERIAL AND THE OPEN CASING OF THE DIMENSIONAL CONTROL STRUCTURE WHILE THE FIRST VACUUM ZONE IS UNDER VACUUM TO REMOVE VOLATILES AND GASES FROM THE COMPOSITE MATERIAL ON THE RIGID CURING TOOL

812 — WHEREIN PERFORMING DOUBLE VACUUM DEBULK FURTHER COMPRISES HEATING THE COMPOSITE MATERIAL WHILE THE FIRST VACUUM ZONE IS UNDER VACUUM AND THE SECOND VACUUM ZONE IS UNDER VACUUM

814 — WHEREIN HEATING THE COMPOSITE MATERIAL COMPRISES: HEATING THE COMPOSITE MATERIAL BY AN INDUCTION HEATING CIRCUIT OF THE RIGID CURING TOOL WHILE THE FIRST VACUUM ZONE IS UNDER VACUUM AND THE SECOND VACUUM ZONE IS UNDER VACUUM

816 — WHEREIN THE VACUUM BAGGING MATERIAL IS AN INDUCTIVE HEATING BLANKET, AND WHEREIN HEATING THE COMPOSITE MATERIAL FURTHER COMPRISES HEATING THE COMPOSITE MATERIAL BY THE INDUCTIVE HEATING BLANKET

LOWERING THE DIMENSIONAL CONTROL STRUCTURE TOWARDS THE COMPOSITE MATERIAL UNTIL A LATTICE OF THE DIMENSIONAL CONTROL STRUCTURE IS POSITIONED TO MAINTAIN DIMENSIONS OF THE COMPOSITE MATERIAL USING THE LATTICE, THE LATTICE POSITIONED WITHIN A CONCAVITY OF AN OPEN CASING OF THE DIMENSIONAL CONTROL STRUCTURE

804

818 — WHEREIN LOWERING THE DIMENSIONAL CONTROL STRUCTURE COMPRISES LOWERING THE DIMENSIONAL CONTROL STRUCTURE UNTIL THE LATTICE IS IN CONTACT WITH THE VACUUM BAGGING MATERIAL

CURING THE COMPOSITE MATERIAL WHILE THE LATTICE OF THE DIMENSIONAL CONTROL STRUCTURE IS POSITIONED TO MAINTAIN THE DIMENSIONS OF THE COMPOSITE MATERIAL

806

820 — WHEREIN CURING THE COMPOSITE MATERIAL COMPRISES HEATING THE COMPOSITE MATERIAL TO A CURING TEMPERATURE OF THE COMPOSITE MATERIAL AFTER RELEASING THE VACUUM FROM THE SECOND VACUUM ZONE

END

1002 — SPECIFICATION AND DESIGN

1004 — MATERIAL PROCUREMENT

1006 — COMPONENT AND SUBASSEMBLY MANUFACTURING

1008 — SYSTEM INTEGRATION

1010 — CERTIFICATION AND DELIVERY

1012 — IN SERVICE

1014 — MAINTENANCE AND SERVICE

1100

AIRCRAFT

1102 — AIRFRAME      INTERIOR — 1106

SYSTEMS

PROPULSION SYSTEM

ELECTRICAL SYSTEM 1108      1112

1110      1114

HYDRAULIC SYSTEM

ENVIRONMENTAL SYSTEM

1104

CURING COMPOSITES OUT-OF-AUTOCLAVE USING INDUCTION HEATING WITH SMART SUSCEPTORS

CROSS-REFERENCE TO RELATED APPLICATION

This application claims the benefit of U.S. Provisional Patent Application Ser. No. 63/373,803, filed Aug. 29, 2022, and entitled "Curing Composite Out-of-Autoclave Using Induction Heating with Smart Susceptors;" which is incorporated herein by reference in its entirety.

BACKGROUND INFORMATION

1. Field

The present disclosure relates generally to methods and equipment for out-of-autoclave curing of composite parts, and deals more particularly with a method and stand-alone tooling for curing relatively large parts using induction heating and smart susceptors.

2. Background

A composite part can be cured in an oven or an autoclave where heat is applied to the part while supported on a cure tool that maintains the shape of the composite part during the curing process. Techniques have been developed for curing composite parts without the need for an oven or autoclave, however these techniques have been limited to curing relatively small parts and/or utilize relatively complicated and/or expensive tooling. Reducing manufacturing costs and manufacturing time is desirable for manufacturing. Accordingly, there is a need for a method and apparatus for curing composite parts out-of-autoclave that employ relatively simple cure tooling. There is also a need for a method and apparatus of the type mentioned above that is well suited for curing relatively large scale parts out-of-autoclave.

Therefore, it would be desirable to have a method and apparatus that takes into account at least some of the issues discussed above, as well as other possible issues.

SUMMARY

An embodiment of the present disclosure provides a dimensional control structure for curing a composite panel. The dimensional control structure comprises a lattice formed of spar stiffener proxies and rib stiffener proxies, and an open casing formed of a rigid material. The lattice is positioned within a concavity of the open casing. Each spar stiffener proxy of the spar stiffener proxies and each rib stiffener proxy of the rib stiffener proxies is positioned in a designed location for a design of the composite panel.

Another embodiment of the present disclosure provides an induction curing system for curing a composite panel. The induction curing system comprises a rigid curing tool configured to hold a composite material, a vacuum bagging material sealed to the rigid curing tool, and a dimensional control structure having a lattice and an open casing formed of a rigid material, the dimensional control structure sealed to at least one of the vacuum bagging material or the rigid curing tool. The lattice is positioned within a concavity of the open casing.

Yet another embodiment of the present disclosure provides a method of curing a composite panel. A vacuum is pulled in a first vacuum zone between a vacuum bagging material and a rigid curing tool while a composite material is on the rigid curing tool. A vacuum is pulled in a second vacuum zone between the vacuum bagging material and an open casing of a dimensional control structure while the first vacuum zone is under vacuum to remove volatiles and gases from the composite material on the rigid curing tool, the open casing formed of a rigid material, and the dimensional control structure having a lattice within a concavity of the open casing. The vacuum in the second vacuum zone is at least partially released. The dimensional control structure is lowered towards the composite material until the lattice is positioned to maintain dimensions of the composite material using the lattice.

A further embodiment of the present disclosure provides a method of curing a composite material. Double vacuum debulk is performed on a composite material using a dimensional control structure, a vacuum bagging material, and a rigid curing tool, the composite material positioned between the vacuum bagging material and the rigid curing tool. The dimensional control structure is lowered towards the composite material until a lattice of the dimensional control structure is positioned to maintain dimensions of the composite material using the lattice, the lattice positioned within a concavity of an open casing of the dimensional control structure. The composite material is cured while the lattice of the dimensional control structure is positioned to maintain the dimensions of the composite material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 7A and 7B is a flowchart of a method of curing a composite panel in accordance with an illustrative embodiment;

FIG. 8 is a flowchart of a method of curing a composite panel in accordance with an illustrative embodiment;

DETAILED DESCRIPTION

The illustrative examples recognize and take into account one or more different considerations. The illustrative examples recognize and take into account that in manufacturing composite structures, layers of composite material are typically laid up on a tool. The layers may be laid up in the form of tape, tows, or other suitable forms. In some cases, resin may be infused or pre-impregnated into the fiber layers. Composite materials with resin pre-impregnated are commonly referred to as prepreg.

The different layers of prepreg may be laid up in different orientations and different numbers of layers may be used depending on the thickness of the composite structure being manufactured. These layers may be laid up using automated lamination equipment such as a tape laminating machine or a fiber placement system.

For thermoset composite materials, after the different layers have been laid up on the tool, the layers of composite material are cured. Thermoset composite materials are cured upon exposure to at least one of temperature and pressure, thus forming the final composite structure.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

The illustrative examples recognize and take into account that it would be desirable to decrease at least one of manufacturing time or manufacturing cost of manufacturing large composite structures. The illustrative examples recognize and take into account that manufacturing time can be reduced by using induction heating. The illustrative examples recognize and take into account that manufacturing time can be reduced by combining manufacturing steps. The illustrative examples recognize and take into account that reducing manufacturing cost may be accomplished by reducing out of tolerance components.

The illustrative examples reduce manufacturing time compared to using an autoclave. The illustrative examples provide an energy savings compared to autoclaves due to localized heating. The illustrative examples can also reduce down time for composite materials due to autoclave or oven queues.

Figure 1:
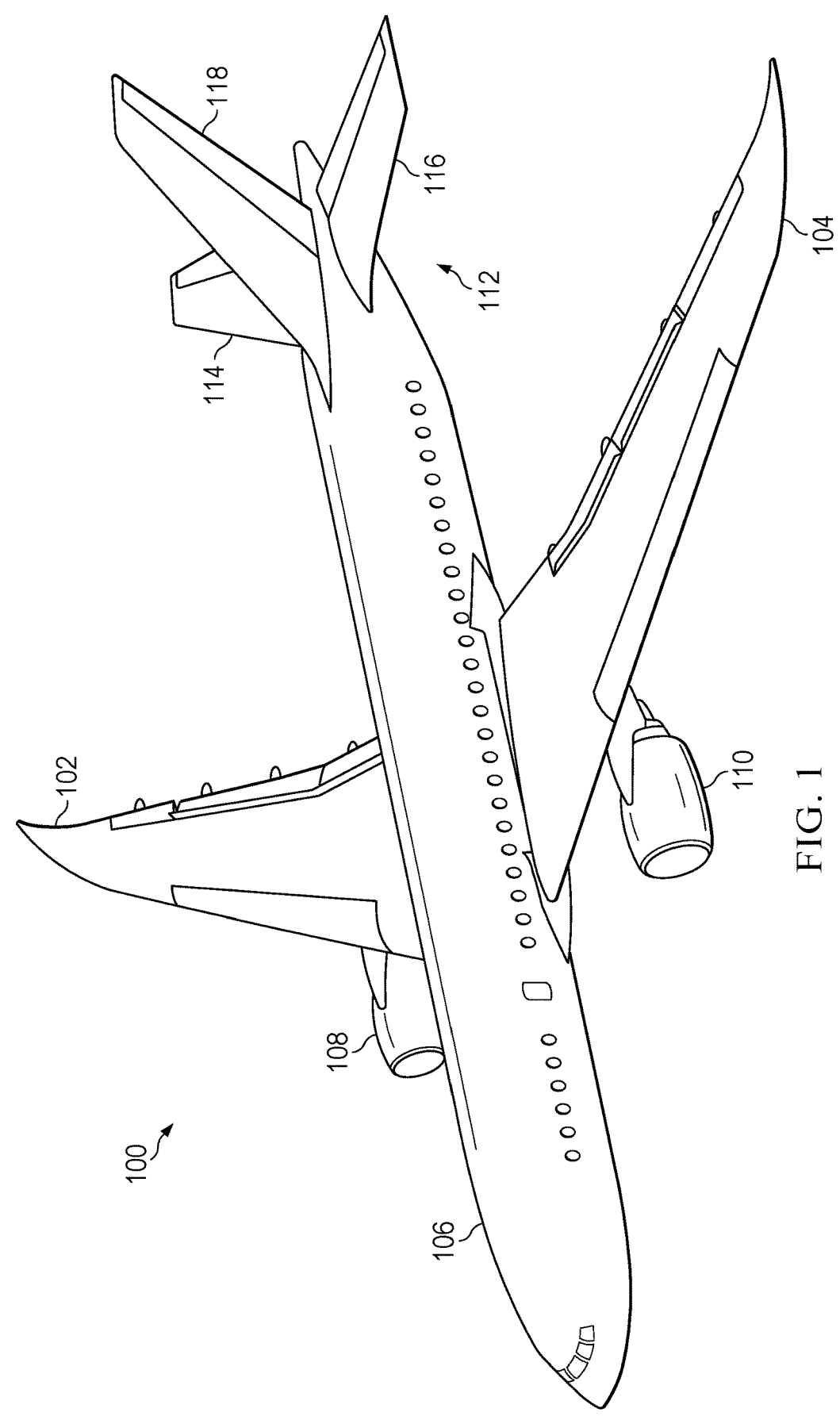
FIG. 1 is an illustration of an aircraft in which an illustrative embodiment may be implemented.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having large composite components that can be manufactured using the induction curing system and methods. Aircraft 100 is an example of an aircraft having large composite components that can be manufactured using double vacuum debulk and curing using a dimensional control structure.

Figure 2:
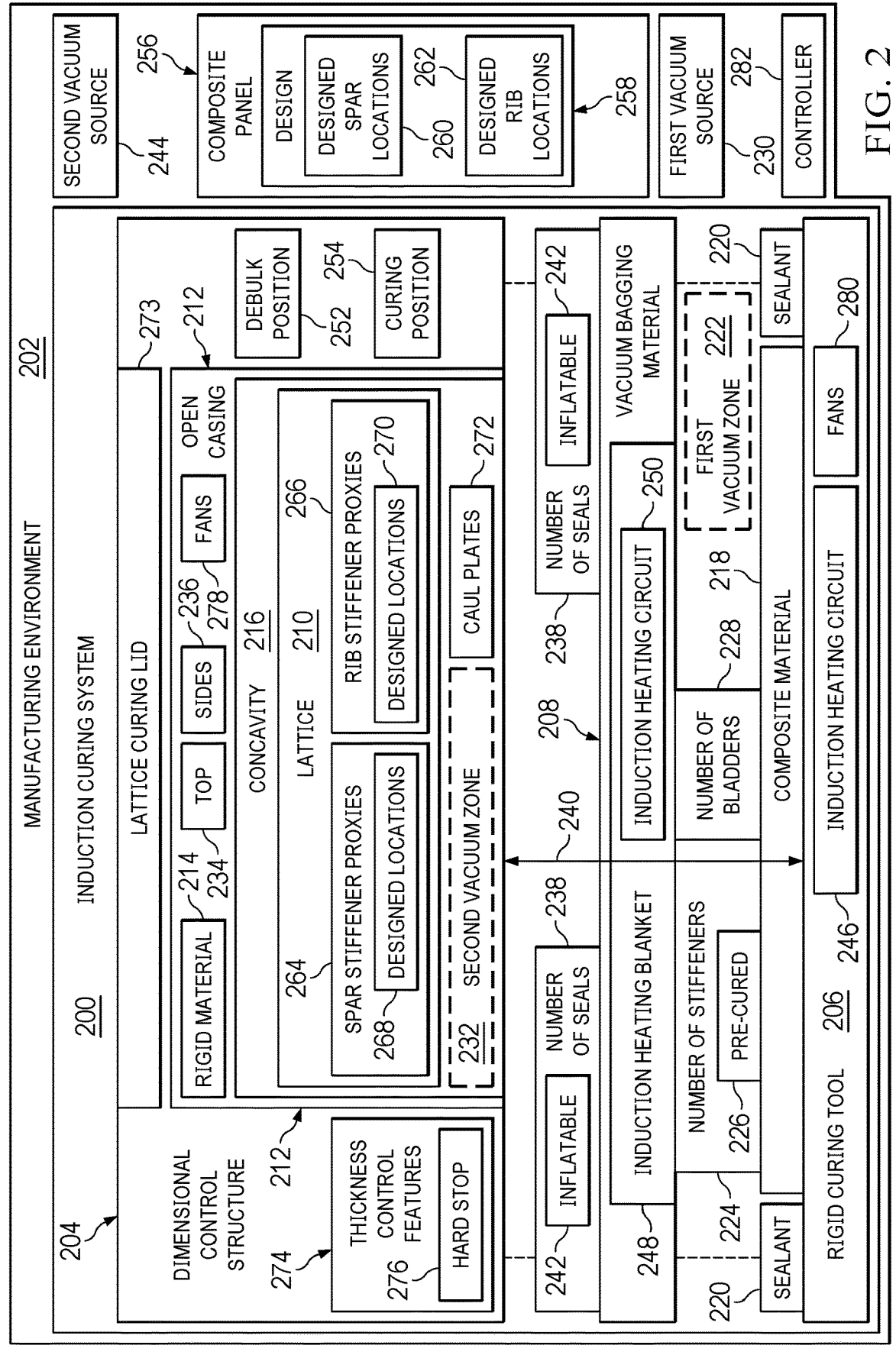
FIG. 2 is an illustration of a block diagram of a manufacturing environment in which an illustrative embodiment may be implemented.

Turning now to FIG. 2, a block diagram of a manufacturing environment is depicted in which an illustrative embodiment may be implemented. Induction curing system 200 is present within manufacturing environment 202. Induction curing system 200 can be used to manufacture a portion of aircraft 100, such as a skin of one of wing 102, wing 104, or body 106 of aircraft 100.

Induction curing system 200 comprises dimensional control structure 204, rigid curing tool 206, and vacuum bagging material 208. Dimensional control structure 204 has lattice 210 and open casing 212. Open casing 212 is formed of rigid material 214. In some illustrative examples, open casing 212 can be referred to as a "hardback shell". Lattice 210 is positioned within concavity 216 of open casing 212. Rigid curing tool 206 is configured to hold composite material 218. Vacuum bagging material 208 is sealed to rigid curing tool 206. Dimensional control structure 204 is sealed to at least one of vacuum bagging material 208 or rigid curing tool 206. Dimensional control structure 204 can be used to cure composite material 218 without an oven, autoclave or similar large, heating enclosure.

As depicted, vacuum bagging material 208 is sealed to rigid curing tool 206 by sealant 220. Sealing vacuum bagging material 208 to rigid curing tool 206 forms first vacuum zone 222. Composite material 218 is present within first vacuum zone 222 between vacuum bagging material 208 and rigid curing tool 206. Composite material 218 is debulked and cured within first vacuum zone 222.

In some illustrative examples, composite material 218 comprises laminated plies of fiber reinforced polymer resin. In some illustrative examples, composite material 218 is carbon fiber epoxy.

Composite material 218 is placed on the surface of rigid curing tool 206 prior to sealing vacuum bagging material 208 to rigid curing tool 206. In some illustrative examples, composite material 218 is placed onto rigid curing tool 206 as one piece. In some illustrative examples, composite material 218 is placed onto rigid curing tool 206 in a pick and place process. In some illustrative examples, composite material 218 is placed onto rigid curing tool 206 by laying up composite material 218 on rigid curing tool 206 using automated or hand layup techniques. In some of these illustrative examples, composite material 218 can be laid up on rigid curing tool 206, dimensional control structure 204 can be sealed, and a double vacuum debulk and cure can be performed on composite material 218 at the layup station.

In some illustrative examples, number of stiffeners 224 are present on composite material 218 during curing of composite material 218. In some illustrative examples, number of stiffeners 224 are pre-cured 226. When number of stiffeners 224 are pre-cured 226, number of stiffeners 224 are placed onto composite material 218 when composite material 218 is uncured and number of stiffeners 224 is cured. In some illustrative examples, when number of stiffeners 224 is present on composite material 218, number of bladders 228 is present to support number of stiffeners 224 during curing of composite material 218.

To debulk composite material 218, a double vacuum debulk is performed on composite material 218 using induction curing system 200. A vacuum is pulled within first vacuum zone 222. Vacuum is applied to first vacuum zone 222 by first vacuum source 230.

Second vacuum zone 232 is formed between vacuum bagging material 208 and open casing 212 of dimensional control structure 204. Open casing 212 is formed by top 234 and sides 236. Sides 236 of open casing 212 are sealed to at least one of vacuum bagging material 208 or rigid curing tool 206 with number of seals 238. As depicted, sides 236 of open casing 212 are sealed to vacuum bagging material 208 with number of seals 238.

Number of seals 238 between dimensional control structure 204 and at least one of vacuum bagging material 208 or rigid curing tool 206 is configured to maintain second vacuum zone 232 between dimensional control structure 204 and vacuum bagging material 208 as distance 240 between dimensional control structure 204 and rigid curing tool 206 decreases. As vacuum is initially applied to first vacuum zone 222, dimensional control structure 204 is positioned above rigid curing tool 206 such that dimensional control structure 204 does not contact rigid curing tool 206 or vacuum bagging material 208. In some illustrative examples, number of seals 238 is inflatable 242.

Vacuum is applied to second vacuum zone 232 by second vacuum source 244. Pulling a vacuum in second vacuum zone 232 relieves clamping force on vacuum bagging material 208. Removing clamping force from vacuum bagging material 208 removes the clamping force from composite material 218, allowing any air or volatiles to more easily exit composite material 218. Applying vacuum to second vacuum zone 232 aids in debulking composite material 218.

Composite material 218 is heated to allow air and volatiles to exit composite material 218. In some illustrative examples, rigid curing tool 206 comprises induction heating circuit 246. Induction heating circuit 246 comprises a conductor for receiving current and generating a magnetic field in response to the current. Induction heating circuit 246 further comprises magnetic material located adjacent to the conductor. The magnetic material generates heat in response to the magnetic field. In some illustrative examples, the magnetic material is a susceptor material having a Curie temperature. The Curie temperature is a temperature at which the susceptor material becomes non-magnetic. The heating of the susceptor material due to the magnetic fields ceases when the susceptor material reaches the Curie temperature.

The susceptor material may be referred to as a "smart susceptor". The susceptor material extends along the conductor. In some illustrative examples, the susceptor material is coaxially mounted to the conductor and electrically insulated from the conductor for induction heating in response to the magnetic field.

In some illustrative examples, vacuum bagging material 208 is induction heating blanket 248. In other illustrative examples, vacuum bagging material 208 is a separate material from induction heating blanket 248. For example, vacuum bagging material 208 can be placed over induction heating blanket 248 and sealed to rigid curing tool 206.

Induction heating blanket 248 is flexible and conformable to composite material 218. Due to the flexibility of induction heating blanket 248, induction heating blanket 248 can be used with a variety of different shapes and sizes of composite materials. Rigid curing tool 206 and induction heating blanket 248 are each inductively heated to heat composite material 218. Induction heating blanket 248 is inductively heated to a desired temperature by induction heating circuit 250 in induction heating blanket 248.

Pressure in second vacuum zone 232 is adjusted to debulk composite material 218. After debulking objections have been met, the vacuum in second vacuum zone 232 is at least partially released. While heating composite material 218, the vacuum in second vacuum zone 232 is at least partially released. When atmospheric pressure is present in second vacuum zone 232, the clamping pressure is applied to vacuum bagging material 208. The amount of clamping force on vacuum bag material 208 can be manipulated by adjusting the amount of atmosphere allowed to enter second vacuum zone 232.

During debulk of composite material 218, dimensional control structure 204 is at debulk position 252. After at least partially releasing the vacuum in second vacuum zone 232, dimensional control structure 204 is lowered towards rigid curing tool 206. By lowering dimensional control structure 204, distance 240 between dimensional control structure 204 and rigid curing tool 206 is reduced. Dimensional control structure 204 is lowered from debulk position 252 to curing position 254. Number of seals 238 maintain the integrity of second vacuum zone 232 as distance 240 between dimensional control structure 204 and rigid curing tool 206 changes. Number of seals 238 maintain the sealing of dimensional control structure 204 to at least one of vacuum bagging material 208 or rigid curing tool 206 as distance 240 changes.

In curing position 254, dimensional control structure 204 maintains dimensions of portions of composite material 218 during cure of composite material 218. Composite panel 256 is a cured product formed from composite material 218. Composite panel 256 has design 258. Design 258 is a preset layout including curvature, thickness, and positions of components joined to composite material 218. Design 258 includes designed spar locations 260 and designed rib locations 262. Designed spar locations 260 are locations for spars to be positioned on composite panel 256. Designed rib locations 262 are locations for ribs to be positioned on composite panel 256.

Lattice 210 of dimensional control structure 204 comprises spar stiffener proxies 264 and rib stiffener proxies 266. Each spar stiffener proxy of spar stiffener proxies 264 and each rib stiffener proxy of rib stiffener proxies 266 is positioned in a designed location for design 258 of composite panel 256. For example, spar stiffener proxies 264 have designed locations 268. Designed locations 268 are configured such that spar stiffener proxies 264 control thickness of composite material 218 in designed spar locations 260. As another example, rib stiffener proxies 266 have designed locations 270. Designed locations 270 are configured such that rib stiffener proxies 266 control thickness of composite material 218 in designed rib locations 262.

Spar stiffener proxies 264 have designed locations 268 and footprints to approximate spars to be joined to composite material 218 after curing composite material 218. Rib stiffener proxies 266 have designed locations 270 and footprints to approximate ribs to be joined to composite material 218 after curing composite material 218. Spar stiffener proxies 264 and rib stiffener proxies 266 are configured to function as caul plates 272.

Dimensional control structure 204 is positioned to maintain a desired thickness in composite material 218 at designed spar locations 260 and designed rib locations 262 during curing of composite material 218. In some illustrative examples, dimensional control structure 204 can be referred to as lattice curing lid 273.

To maintain designed thicknesses in composite material 218, dimensional control structure 204 is stopped at curing position 254. In some illustrative examples, dimensional control structure 204 has thickness control features 274 to position dimensional control structure 204 at curing position 254. In some illustrative examples, thickness control features 274 take the form of hard stop 276. In some illustrative examples, hard stop 276 of dimensional control structure 204 contacts rigid curing tool 206. In some illustrative examples, hard stop 276 is a portion of rigid curing tool 206 that contacts at least one side of sides 236 of dimensional control structure 204. In some illustrative examples, thickness control features 274 are attached to open casing 212.

Spar stiffener proxies 264 and rib stiffener proxies 266 are formed of any desirable material. Spar stiffener proxies 264 and rib stiffener proxies 266 are formed of materials configured to maintain material integrity at curing temperatures of composite material 218. Spar stiffener proxies 264 and rib stiffener proxies 266 are formed of materials configured to maintain size and shape at curing temperatures of composite material 218. In some illustrative examples, spar stiffener proxies 264 and rib stiffener proxies 266 are formed of Invar. In some illustrative examples, spar stiffener proxies 264 and rib stiffener proxies 266 are formed of a composite material, such as a carbon fiber composite material.

After lowering dimensional control structure 204 to curing position 254, heat is applied to composite material 218 until composite material 218 reaches a curing temperature. Dimensional control structure 204 is maintained in curing position 254 while composite material 218 is cured.

At least one of induction heating circuit 246 or induction heating circuit 250 is used to heat composite material 218. In some illustrative examples, convection cooling can be used in at least one of rigid curing tool 206 or dimensional control structure 204 to control temperature.

In some illustrative examples, fans are present in at least one of open casing 212 of dimensional control structure 204 or rigid curing tool 206. In some illustrative examples, fans 278 are present in open casing 212 of dimensional control structure 204. In some illustrative examples, fans 278 are within concavity 216. In some illustrative examples, fans 280 are present in rigid curing tool 206.

Fans 278 can be used to decrease cycle time by speeding up the cooling of composite material 218 and dimensional control structure 204. Fans 280 can be used to decrease cycle time by speeding up the cooling of composite material 218 and rigid curing tool 206. Fans 278 and fans 280 can help dissipate excess heat related to exothermic cure reactions. Fans 280 and fans 278 can allow faster ramp times or elimination of isothermal dwells meant to mitigating exotherms.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, number of stiffeners 224 is not present. In some illustrative examples, thickness control features 274 are not present and dimensional control structure 204 is stopped in curing position 254 by controller 282.

Induction curing system 200 provides improvements to composite processing technology. The induction curing system 200 can be used to cure relatively large parts such as, for example and without limitation, wing skins (not shown) used in aircraft. Induction curing system 200 provides thickness control for composite material 218 during curing of composite material. Dimensional control structure 204 provides improvements to debulking and curing of composite material 218 Use of dimensional control structure 204 decreases out of tolerance parts after curing. Use of dimensional control structure 204 also reduces manufacturing time by providing a single induction curing system, induction curing system 200 to be used for both debulking and curing.

Figures 3, 4:
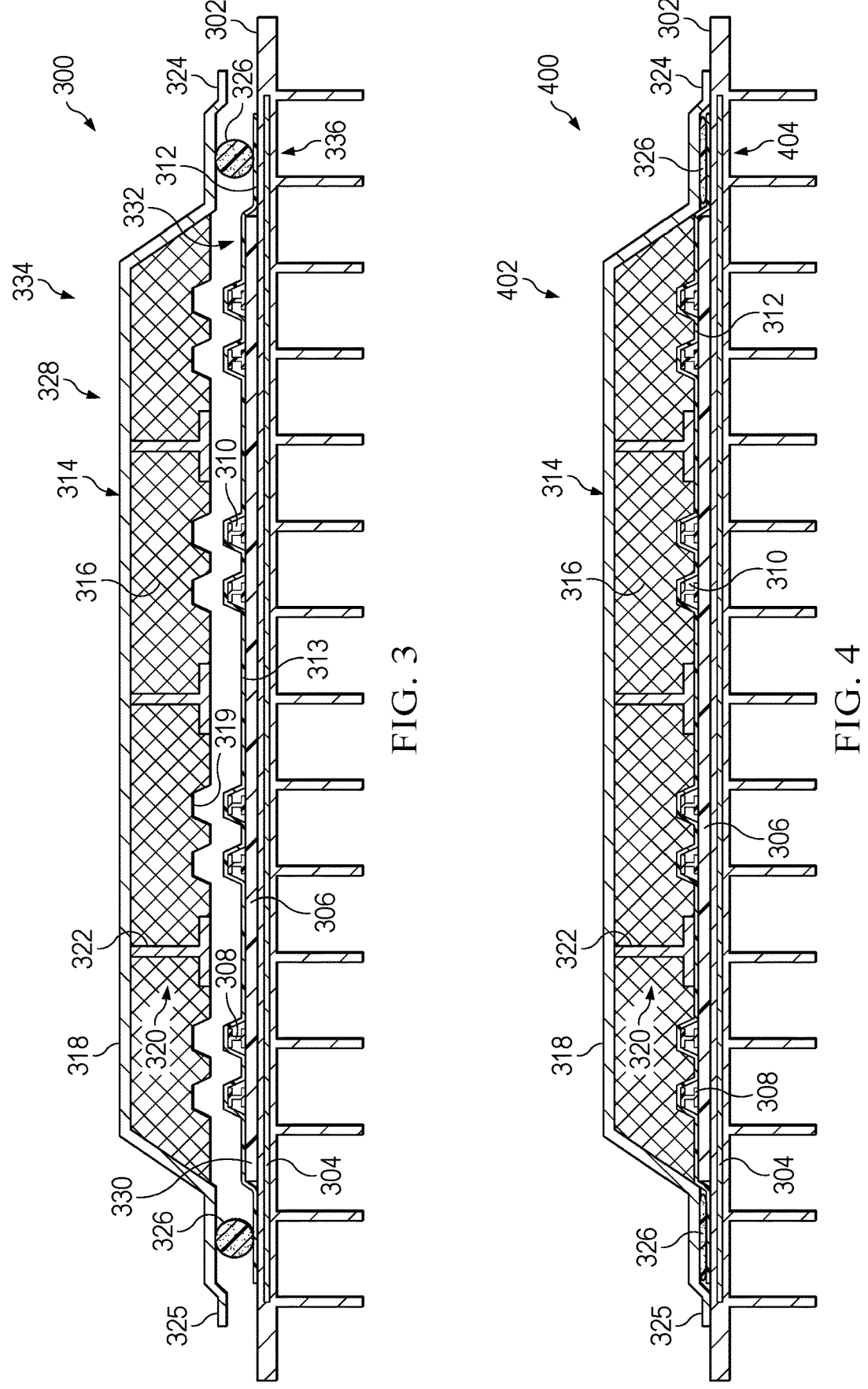
FIG. 3 is a cross-sectional view of an induction curing system in accordance with an illustrative embodiment.
FIG. 4 is a cross-sectional view of an induction curing system in accordance with an illustrative embodiment.

Turning now to FIG. 3, is a cross-sectional view of an induction curing system is depicted in accordance with an illustrative embodiment. Induction curing system 300 is a physical implementation of induction curing system 200 of FIG. 2. Induction curing system 300 comprises rigid curing tool 302. Rigid curing tool 302 has induction heating circuit 304 within rigid curing tool 302. Composite material 306 is present on rigid curing tool 302. Composite material 306 is uncured. In the illustrated example, composite material 306 is depicted as substantially flat, however in other applications, it may have one or more curvatures or contours (not shown). Number of stiffeners 308 is present on composite material 306. Number of stiffeners 308 is pre-cured. Number of bladders 310 support number of stiffeners 308 during debulk and curing of composite material 306.

Vacuum bagging material 312 is sealed to rigid curing tool 302. In this illustrative example, vacuum bagging material 312 comprises induction heating blanket 313.

Dimensional control structure 314 is positioned above rigid curing tool 302. Dimensional control structure 314 comprises lattice 316 and open casing 318. Open casing 318 is formed of a rigid material. Lattice 316 is positioned within concavity 319 of open casing 318. Lattice 316 is formed of spar stiffener proxies 320 and rib stiffener proxies 322. Lattice 316 acts to control dimensions of composite material 306 during curing. Each spar stiffener proxy and each rib stiffener proxy is positioned in a designed location for a design of a composite panel. The composite panel is desirably a product comprising composite material 306 after curing. Each spar stiffener proxy and each rib stiffener proxy is where a rib or a spar would be attached to composite material 306 during later processing.

Dimensional control structure 314 further comprises thickness control feature 324. In this illustrative example, thickness control feature 324 is hard stop 325 configured to contact rigid curing tool 302.

As depicted, dimensional control structure 314 is sealed to vacuum bagging material 312 by number of seals 326. In other non-depicted illustrative examples, dimensional control structure 314 is sealed to rigid curing tool 302 by number of seals 326. Number of seals 326 seals dimensional control structure 314 to vacuum bagging material 312 in debulk position 328. Debulk position 328 is elevated above rigid curing tool 302 and composite material 306. Number of seals 326 sealing dimensional control structure 314 to at least one of vacuum bagging material 312 or rigid curing tool 302 forms second vacuum zone 332 between vacuum bagging material 312 and dimensional control structure 314.

To debulk composite material 306, a vacuum is applied to first vacuum zone 330 between vacuum bagging material 312 and rigid curing tool 302. A vacuum is then applied to second vacuum zone 332 between vacuum bagging material 312 and dimensional control structure 314.

While first vacuum zone 330 and second vacuum zone 332 are under vacuum, composite material 306 is heated. In some illustrative examples, induction heating circuit 304 in rigid curing tool 302 heats composite material 306. In some illustrative examples, induction heating blanket 313 heats composite material 306. After debulking composite material 306, vacuum is at least partially released from second vacuum zone 332.

In view 334 number of seals 326 are in position 336. In some illustrative examples, position 336 is an inflated position. While in position 336, number of seals 326 maintain second vacuum zone 332.

Turning now to FIG. 4, is a cross-sectional view of an induction curing system is depicted in accordance with an illustrative embodiment. View 400 is a view of induction curing system 300 with dimensional control structure 314 in curing position 402. Between view 334 and view 400, dimensional control structure 314 has moved towards rigid curing tool 302. Between view 334 and view 400, a distance between dimensional control structure 314 and rigid curing tool 302 has decreased.

Spar stiffener proxies 320 and rib stiffener proxies 322 act as thickness controlling caul plates. Spar stiffener proxies 320 and rib stiffener proxies 322 maintain the thickness of composite material 306 in locations in which spars and ribs will be joined to composite material 306 after curing.

In view 400, number of seals 326 is in position 404. In some illustrative examples, position 404 is a deflated position. While in position 404, number of seals 326 maintain second vacuum zone 332. In curing position 402, hard stop 406 of dimensional control structure 314 is in contact with rigid curing tool 302.

Figure 5:
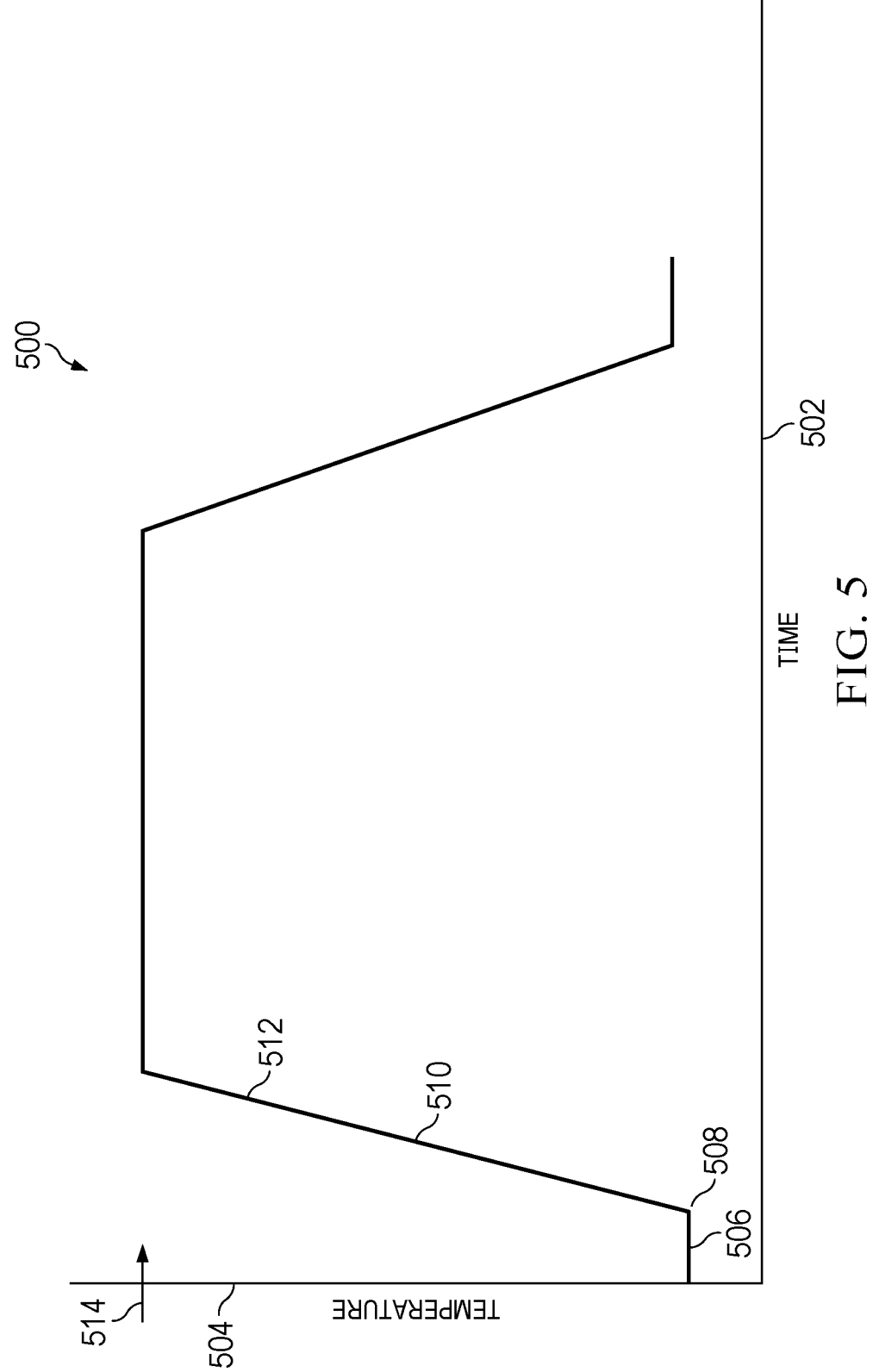
FIG. 5 is a view of a time and temperature graph in accordance with an illustrative embodiment.

Turning now to FIG. 5, is a view of a time and temperature graph is depicted in accordance with an illustrative embodiment. Graph 500 has x-axis 502 of time and y-axis 504 of temperature. Graph 500 depicts an example of temperature during double vacuum debulking and curing of a composite material using induction curing system 200 of FIG. 2. Graph 500 depicts an example of temperature double vacuum debulking and curing of a composite material using induction curing system 300 of FIGS. 3-4.

In one illustrative example, vacuum has already been pulled in a first vacuum zone containing the composite material at the beginning of graph 500. While vacuum is applied in the first vacuum zone vacuum is applied to the second vacuum zone at time 506. After vacuum has been applied to the first vacuum zone and the second vacuum zone, heat is applied to the composite material, and temperature begins to increase at time 508. Temperature increases between time 508 and time 510. Vacuum is at least partially released from second vacuum zone at time 510. Temperature continues to increase after at least partially releasing the vacuum at time 510.

At time 512, a dimensional control system is lowered to maintain dimensions of the composite material during curing. Dimensional control system is lowered prior to reaching cure temperature 514 of the composite material.

Time 508, time 510, and time 512 are only illustrative examples. Values for each of cure temperature 514, time 508, time 510, time 512, and ramp rate of the temperature will be selected based on a type of composite material, part length, part width, and part thickness.

Figure 6:
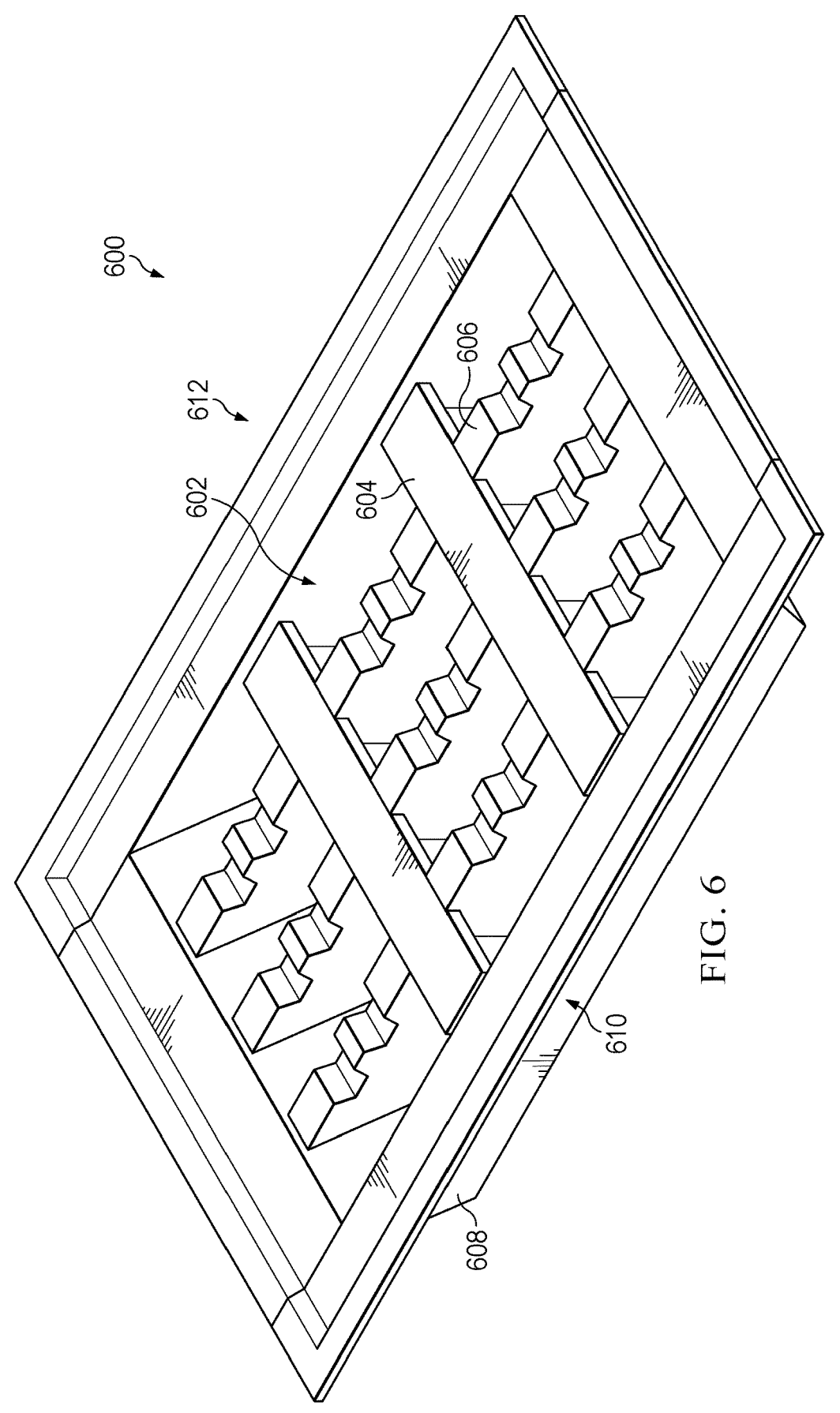
FIG. 6 is an isometric view of a dimensional control structure in accordance with an illustrative embodiment.

Turning now to FIG. 6, is an isometric view of a dimensional control structure is depicted in accordance with an illustrative embodiment. Dimensional control structure 600 is a physical implementation of dimensional control structure 204 of FIG. 2. Dimensional control structure 600 is a physical implementation of dimensional control structure 314 of FIG. 3. Dimensional control structure 600 can utilize the curing program depicted in graph 500 of FIG. 5.

Dimensional control structure 600 comprises lattice 602 formed of spar stiffener proxies 604 and rib stiffener proxies 606 and open casing 608. Each spar stiffener proxy of spar stiffener proxies 604 and each rib stiffener proxy of rib stiffener proxies 606 is positioned in a designed location for a design of a composite panel. Open casing 608 formed of rigid material 610. Lattice 602 is positioned within concavity 612 of open casing 608.

Turning now to FIGS. 7A and 7B, a flowchart of a method of curing a composite panel is depicted in accordance with an illustrative embodiment. Method 700 can be performed using induction curing system 200 of FIG. 2. Method 700 can be performed using induction curing system 300 of FIGS. 3-4. Method 700 can be performed using the curing program of graph 500 of FIG. 5. Method 700 can be performed using dimensional control structure 600 of FIG. 6.

Method 700 pulls a vacuum in a first vacuum zone between a vacuum bagging material and a rigid curing tool while a composite material is on the rigid curing tool (operation 702). Method 700 pulls a vacuum in a second vacuum zone between the vacuum bagging material and an open casing of a dimensional control structure while the first vacuum zone is under vacuum to remove volatiles and gases from the composite material on the rigid curing tool, the open casing formed of a rigid material, and the dimensional control structure having a lattice within a concavity of the open casing (operation 704). Method 700 at least partially releases the vacuum in the second vacuum zone (operation 706). Method 700 lowers the dimensional control structure towards the composite material until the lattice is positioned to maintain dimensions of the composite material using the lattice (operation 708). Afterwards, method 700 terminates.

In some illustrative examples, lowering the dimensional control structure comprises lowering the dimensional control structure until the lattice is in contact with the vacuum bagging material (operation 716). In some illustrative examples, method 700 comprises heating the composite material while the first vacuum zone is under vacuum and the second vacuum zone is under vacuum (operation 710). In some illustrative examples, heating the composite material comprises heating the composite material by an induction heating circuit of the rigid curing tool while the first vacuum zone is under vacuum and the second vacuum zone is under vacuum (operation 712).

In some illustrative examples, the vacuum bagging material is an induction heating blanket, and wherein heating the composite material further comprises heating the composite material by the induction heating blanket (operation 714). In some illustrative examples, method 700 heats the composite material to a curing temperature of the composite material while the dimensional control structure is positioned to maintain the dimension of the composite material (operation 720).

In some illustrative examples, method 700 lowers the dimensional control structure towards the composite material comprises lowering the dimensional control structure until a thickness control feature is contact with both the dimensional control structure and the rigid curing tool (operation 718).

In some illustrative examples, method 700 activates fans in the rigid curing tool to control a temperature of the rigid curing tool (operation 722). In some illustrative examples, method 700 activates fans in the rigid curing tool to control a temperature of the dimensional control structure (operation 724).

Turning now to FIG. 8, a flowchart of a method of curing a composite panel is depicted in accordance with an illustrative embodiment. Method 700 can be performed using induction curing system 200 of FIG. 2. Method 700 can be performed using induction curing system 300 of FIGS. 3-4. Method 700 can be performed using the curing program of graph 500 of FIG. 5. Method 700 can be performed using dimensional control structure 600 of FIG. 6.

Method 800 performs double vacuum debulk on a composite material using a dimensional control structure, a vacuum bagging material, and a rigid curing tool, the composite material positioned between the vacuum bagging material and the rigid curing tool (operation 802). Method 800 lowers the dimensional control structure towards the composite material until a lattice of the dimensional control structure is positioned to maintain dimensions of the composite material using the lattice, the lattice positioned within a concavity of an open casing of the dimensional control structure (operation 804). Method 800 cures the composite material while the lattice of the dimensional control structure is positioned to maintain the dimensions of the composite material (operation 806).

In some illustrative examples, wherein performing double vacuum debulk comprises pulling a vacuum in a first vacuum zone between the vacuum bagging material and the rigid curing tool while the composite material is on the rigid curing tool (operation 808) and pulling a vacuum in a second vacuum zone between the vacuum bagging material and the open casing of the dimensional control structure while the first vacuum zone is under vacuum to remove volatiles and gases from the composite material on the rigid curing tool (operation 810).

In some illustrative examples, wherein curing the composite material comprises heating the composite material to a curing temperature of the composite material after at least partially releasing the vacuum from the second vacuum zone (operation 820). In some illustrative examples, performing double vacuum debulk further comprises heating the composite material while the first vacuum zone is under vacuum and the second vacuum zone is under vacuum (operation 812). In some illustrative examples, wherein heating the composite material comprises heating the composite material by an induction heating circuit of the rigid curing tool while the first vacuum zone is under vacuum and the second vacuum zone is under vacuum (operation 814).

In some illustrative examples, the vacuum bagging material is an induction heating blanket, and wherein heating the composite material further comprises heating the composite material by the induction heating blanket (operation 816). In some illustrative examples, lowering the dimensional control structure comprises lowering the dimensional control structure until the lattice is in contact with the vacuum bagging material (operation 818).

Figure 9:
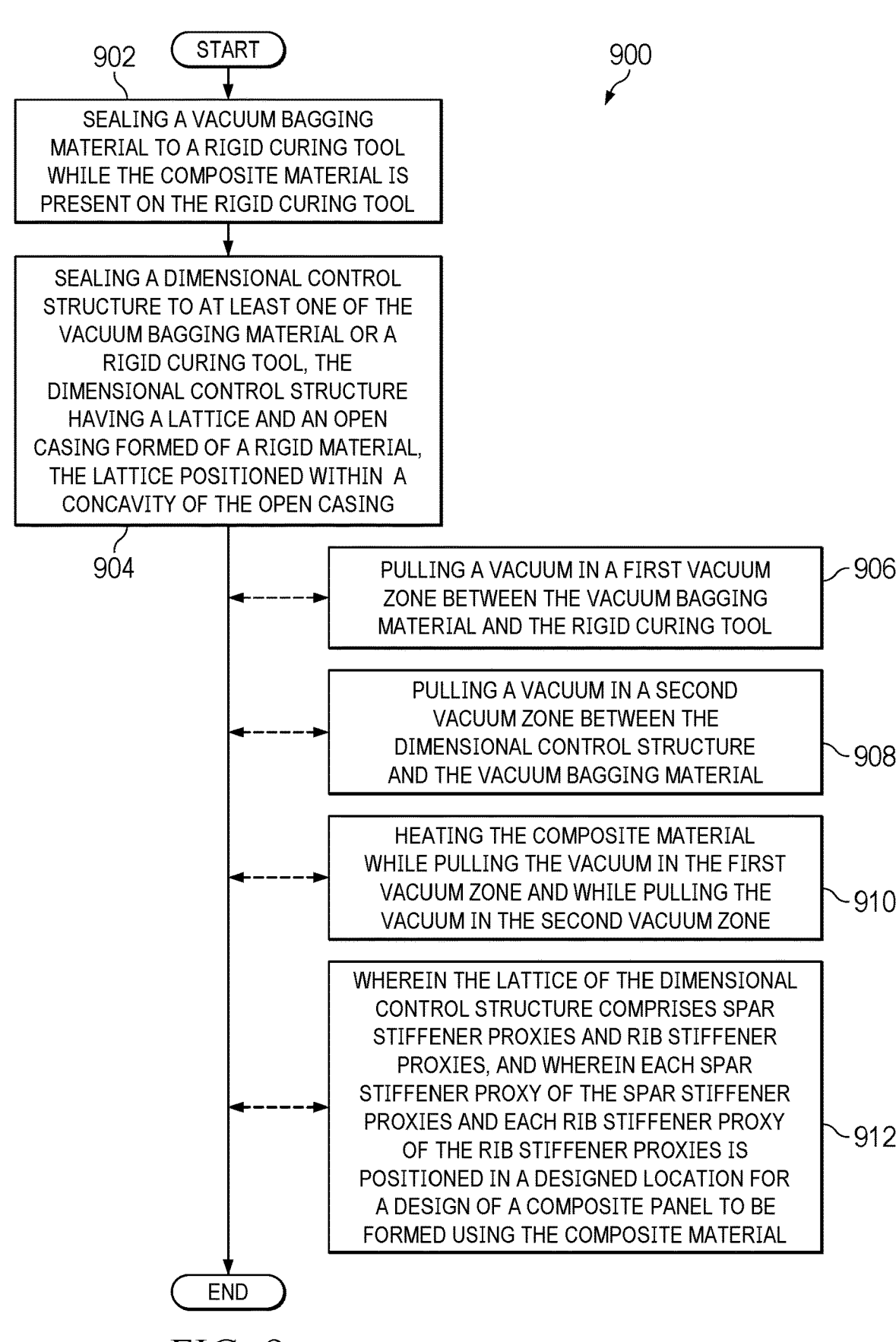
FIG. 9 is a flowchart of a method of debulking a composite panel in accordance with an illustrative embodiment.

Turning now to FIG. 9, a flowchart of a method of debulking a composite panel is depicted in accordance with an illustrative embodiment. Method 900 can be performed using induction curing system 200 of FIG. 2. Method 900 can be performed using induction curing system 300 of FIGS. 3-4. Method 900 can be performed using the curing program of graph 500 of FIG. 5. Method 900 can be performed using dimensional control structure 600 of FIG. 6.

Method 900 seals a vacuum bagging material to a rigid curing tool while the composite material is present on the rigid curing tool (operation 902). Method 900 seals a dimensional control structure to at least one of the vacuum bagging material or a rigid curing tool, the dimensional control structure having a lattice and an open casing formed of a rigid material, the lattice positioned within a concavity of the open casing (operation 904). Afterwards, method 900 terminates.

In some illustrative examples, method 900 pulls a vacuum in a first vacuum zone between the vacuum bagging material and the rigid curing tool (operation 906). In some illustrative examples, method 900 pulls a vacuum in a second vacuum zone between the dimensional control structure and the vacuum bagging material (operation 908).

In some illustrative examples, method 900 heats the composite material while pulling the vacuum in the first vacuum zone and while pulling the vacuum in the second vacuum zone (operation 910). In some illustrative examples, the lattice of the dimensional control structure comprises spar stiffener proxies and rib stiffener proxies, and wherein each spar stiffener proxy of the spar stiffener proxies and each rib stiffener proxy of the rib stiffener proxies is positioned in a designed location for a design of a composite panel to be formed using the composite material (operation 912).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 710 through operation 724 may be optional. As another example, any of operation 808 through operation 820 may be optional. As yet another example, any of operation 906 through operation 912 may be optional.

Figure 10:
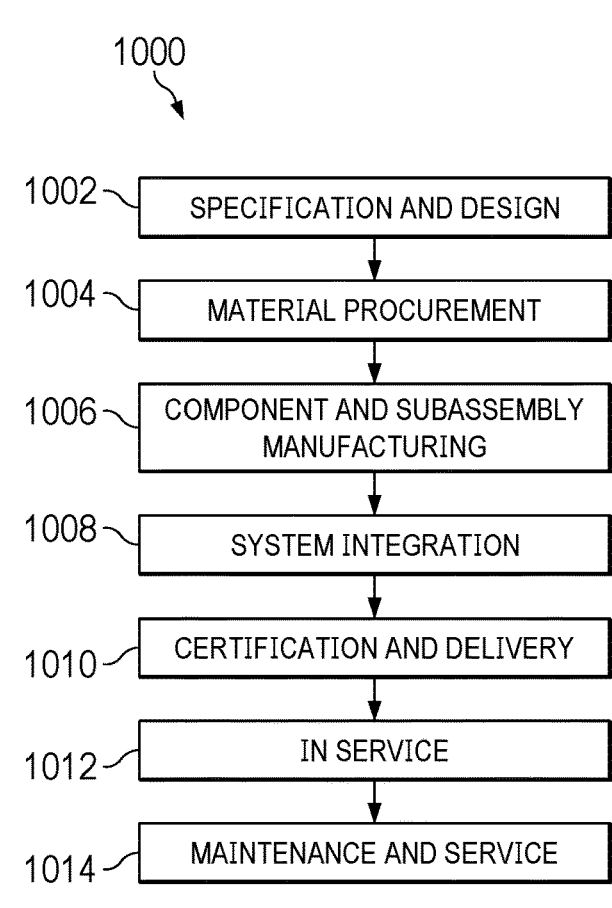
FIG. 10 is an illustration of an aircraft manufacturing and service method in a form of a block diagram in accordance with an illustrative embodiment.
Figure 11:
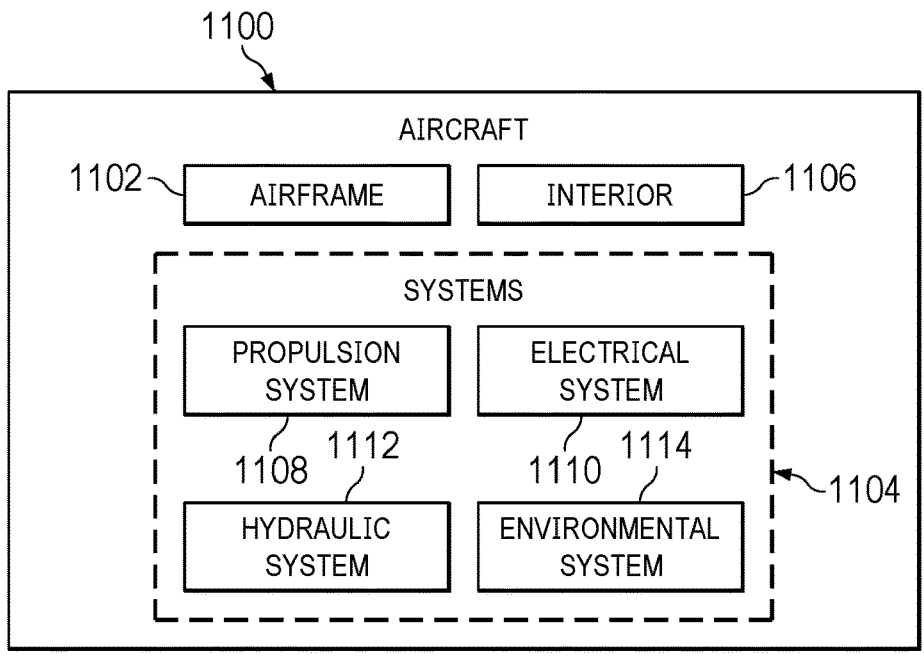
FIG. 11 is an illustration of an aircraft in a form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During preproduction, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, or other maintenance and service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included.

Apparatuses and methods embodied herein may be employed during at least one of the stages of aircraft manufacturing and service method 1000. One or more illustrative embodiments may be manufactured or used during at least one of component and subassembly manufacturing 1006, system integration 1008, in service 1012, or maintenance and service 1014 of FIG. 10.

A portion of airframe 1102 of aircraft 1100 can be formed by method 700 or method 800. Method 700, method 800, or method 900 can be performed during component and subassembly manufacturing 1006. Induction curing system 200 can be used to form a composite structure during component and subassembly manufacturing 1006. In some illustrative examples, a composite structure formed using method 700, method 800, or method 900 is present and utilized during in service 1012. Method 700, method 800, or method 900 can be performed during maintenance and service 1014 to form a replacement part.

The illustrative examples provide induction curing of thermoset components including large planar components. The illustrative examples can debulk and cure large planar aircraft components such as wing skins, horizontal and vertical stabilizer skins, or fuselage skins. The illustrative examples provide out of autoclave double vacuum debulk processing with processing system in line with production flow for more compact factory footprint and reduced inventory. The illustrative examples provide dimensional control of assembly critical surfaces. The illustrative examples provide reduced cure times. In some illustrative examples, by utilizing metal curing tools, in some illustrative examples curing may be performed in under 2 hours. The illustrative examples provide for reduced facilities expenditures. The illustrative examples provide for large energy savings.

The illustrative examples can provide debulking/degassing of horizontal slab skin preform and then out of autoclave curing. The illustrative examples can join heating blankets together with added power pack. The illustrative examples provide integral heating of tool and blanket on non-mold side for heating and curing out of autoclave. The illustrative examples provide double vacuum debulk (DVD) with a hard back shell along with heat and vacuum chamber to extract volatiles. In the illustrative examples, the hardback shell works as a lid to control outer dimensions to resist preform out sizing.

In some illustrative examples, the preform is laid up upon the tool. The illustrative examples allow for laying up the preform, and then adding the lid (dimensional control structure) and curing right at layup station.

The illustrative examples draw vacuum in a first vacuum zone with the preform. The tool and blanket are heated to reduce resin viscosity. A vacuum is pulled in a second vacuum zone within the lid. Gases are extracted from the exposed preform edges. The vacuum is later at least partially released in the second vacuum zone. The lid is lowered. The lid is lowered to help control non-tool dimensions in the composite material. Curing is performed while the lid (dimensional control structure) is controlling the non-tool dimensions of the composite material.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An induction curing system configured to cure a composite panel, wherein the induction curing system comprises:
  a rigid curing tool configured to hold a composite material;
  a vacuum bagging material sealed to the rigid curing tool such that a first vacuum zone is formed between the vacuum bagging material and the rigid curing tool; and
  a dimensional control structure, located outside of the vacuum bagging material and the first vacuum zone, that comprises a lattice attached to three linear surfaces within an open casing formed of a rigid material, the lattice positioned within a concavity of the open casing, wherein the open casing comprises extensions connected to seals connected to at least one of the vacuum bagging material or the rigid curing tool such that a second vacuum zone is formed between the vacuum bagging material and the open casing.

2. The induction curing system of claim 1, further comprising thickness control features attached to the open casing.

3. The induction curing system of claim 1, wherein the lattice comprises spar stiffener proxies and rib stiffener proxies that comprise Invar or a composite material.

4. The induction curing system of claim 1, further comprising fans within the concavity.

5. The induction curing system of claim 1, wherein the lattice of the dimensional control structure comprises spar stiffener proxies and rib stiffener proxies, and wherein each spar stiffener proxy of the spar stiffener proxies and each rib stiffener proxy of the rib stiffener proxies is positioned in a designed location for a design of the composite panel.

6. The induction curing system of claim 1, wherein the extensions are configured to contact the rigid curing tool and limit a closeness of the lattice to the rigid curing tool.

7. The induction curing system of claim 6, wherein the seals are inflatable and deflatable.

8. The induction curing system of claim 1, wherein the vacuum bagging material is an induction heating blanket.

9. The induction curing system of claim 1, wherein the rigid curing tool comprises an induction heating circuit.

10. The induction curing system of claim 1, further comprising:
  fans present in at least one of the open casing of the dimensional control structure or the rigid curing tool.

11. A method of curing a composite material, the method comprising:

providing an induction curing system comprising:

a rigid curing tool configured to hold the composite material;

a vacuum bagging material sealed to the rigid curing tool such that a first vacuum zone is formed between the vacuum bagging material and the rigid curing tool; and a dimensional control structure, located outside of the vacuum bagging material and the first vacuum zone, that comprises a lattice attached to three linear surfaces within an open casing formed of a rigid material, the lattice positioned within a concavity of the open casing, wherein the open casing comprises extensions connected to seals connected to at least one of the vacuum bagging material or the rigid curing tool such that a second vacuum zone is formed between the vacuum bagging material and the open casing;

pulling a vacuum in the first vacuum zone between the vacuum bagging material and the rigid curing tool while the composite material is on the rigid curing tool;

pulling a vacuum in the a second vacuum zone between the vacuum bagging material and the open casing while the first vacuum zone is under vacuum removing volatiles and gases from the composite material on the rigid curing tool;

at least partially releasing the vacuum in the second vacuum zone; and lowering the dimensional control structure towards the composite material until the lattice is positioned maintaining dimensions of the composite material using the lattice.

12. The method of claim 11, wherein lowering the dimensional control structure comprises lowering the dimensional control structure until the lattice is in contact with the vacuum bagging material.

13. The method of claim 11, further comprising:

heating the composite material while the first vacuum zone is under vacuum and the second vacuum zone is under vacuum.

14. The method of claim 13, wherein heating the composite material comprises:

heating the composite material by an induction heating circuit of the rigid curing tool while the first vacuum zone is under vacuum and the second vacuum zone is under vacuum.

15. The method of claim 13, wherein the vacuum bagging material is an induction heating blanket, and wherein heating the composite material further comprises:

heating the composite material by the induction heating blanket.

16. The method of claim 13, further comprising:

heating the composite material to a curing temperature of the composite material while the dimensional control structure is positioned to maintain a dimension of the composite material.

17. The method of claim 11, further comprising lowering the dimensional control structure until a thickness control feature contacts both the dimensional control structure and the rigid curing tool.

18. The method of claim 11, further comprising:

activating fans in the rigid curing tool to control a temperature of the rigid curing tool.

19. The method of claim 11, further comprising:

activating fans in the rigid curing tool to control a temperature of the dimensional control structure.

20. A method of curing a composite material, the method comprising:

providing an induction curing system comprising:

a rigid curing tool configured to hold the composite material;

a vacuum bagging material sealed to the rigid curing tool such that a first vacuum zone is formed between the vacuum bagging material and the rigid curing tool; and a dimensional control structure, located outside of the vacuum bagging material and the first vacuum zone, that comprises a lattice attached to three linear surfaces within an open casing formed of a rigid material, the lattice positioned within a concavity of the open casing, wherein the open casing comprises extensions connected to seals connected to at least one of the vacuum bagging material or the rigid curing tool such that a second vacuum zone is formed between the vacuum bagging material and the open casing;

performing double vacuum debulk on the composite material using the dimensional control structure, the vacuum bagging material, and the rigid curing tool, the composite material positioned between the vacuum bagging material and the rigid curing tool; and lowering the dimensional control structure towards the composite material until the lattice of the dimensional control structure is positioned maintaining dimensions of the composite material using the lattice; and curing the composite material while the lattice of the dimensional control structure is positioned maintaining the dimensions of the composite material.

21. A method of debulking a composite material, the method comprising:

providing an induction curing system comprising:

a rigid curing tool configured to hold the composite material;

a vacuum bagging material sealed to the rigid curing tool such that a first vacuum zone is formed between the vacuum bagging material and the rigid curing tool; and a dimensional control structure, located outside of the vacuum bagging material and the first vacuum zone, that comprises a lattice attached to three linear surfaces within an open casing formed of a rigid material, the lattice positioned within a concavity of the open casing, wherein the open casing comprises extensions connected to seals connected to at least one of the vacuum bagging material or the rigid curing tool such that a second vacuum zone is formed between the vacuum bagging material and the open casing;

sealing the vacuum bagging material to the rigid curing tool while the composite material is present on the rigid curing tool; and sealing the dimensional control structure to at least one of the vacuum bagging material or the rigid curing tool.

* * * * *